(12) United States Patent
Martella

(10) Patent No.: US 6,905,179 B2
(45) Date of Patent: Jun. 14, 2005

(54) ANTI-LOCK BRAKING SYSTEM LOW PRESSURE ACCUMULATOR FOR PROTECTION MASTER CYLINDER LIP SEALS

(75) Inventor: David P. Martella, Oxford, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 10/360,332

(22) Filed: Feb. 7, 2003

(65) Prior Publication Data
US 2004/0155522 A1 Aug. 12, 2004

(51) Int. Cl.$^7$ ................................. B60T 8/34
(52) U.S. Cl. ...................... 303/116.2; 303/113.2
(58) Field of Search ................. 303/113.1–116.2, 303/87

(56) References Cited

U.S. PATENT DOCUMENTS

| | | | |
|---|---|---|---|
| 5,290,098 A | * 3/1994 | Burgdorf et al. | 303/115.4 |
| 5,411,326 A | 5/1995 | Linhoff | 303/116.2 |
| 5,567,128 A | 10/1996 | Volz et al. | 417/313 |
| 5,577,384 A | * 11/1996 | Watanabe et al. | 60/550 |
| 5,927,828 A | * 7/1999 | Beck | 303/116.2 |
| 6,195,995 B1 | * 3/2001 | Bartsch | 60/564 |
| 6,290,310 B1 | * 9/2001 | Kusano | 303/122.11 |

* cited by examiner

Primary Examiner—Christopher P. Schwartz

(57) ABSTRACT

A braking system includes an accumulator positioned along the brake line between the wheel brake and a pump. The accumulator includes a cylinder defining a bore and a piston fitted within the bore. The cylinder defines an inlet and an outlet fluidically connecting the bore to the brake line. The outlet is axially spaced from the inlet and is positioned to be sealed closed by the piston when it is proximate to inlet. The accumulator stores a reserved volume of fluid that is not delivered to the pump via the outlet to thereby reduce the volume of fluid delivered to the master cylinder by the pump and prevent damage to the lip seals during ABS control.

20 Claims, 4 Drawing Sheets

ANTI-LOCK BRAKING SYSTEM LOW PRESSURE ACCUMULATOR FOR PROTECTION MASTER CYLINDER LIP SEALS

FIELD OF THE INVENTION

The present invention relates generally to anti-lock braking systems, and more particularly relates to the design of a low pressure accumulator in the braking system.

BACKGROUND OF THE INVENTION

Many automotive vehicles employ a braking system having a tandem master cylinder with dual compensation ports. The compensation ports provide brake fluid to the master cylinder from a reservoir. These braking systems also utilize anti-locking braking systems (ABS) in order to increase vehicle directional stability—in a braking condition. During ABS events, a pump is utilized to remove fluid from the wheel brake and return it to the master cylinder.

Unfortunately, the potential exists to damage the master cylinder during ABS control. As shown in FIG. 6, the tandem master cylinder 26 generally includes two pistons 11, 12 having lip seals 13, 14 for controlling the flow of brake fluid through the dual compensation ports 15, 16. When a sufficient amount of fluid is pumped from the wheel brake to the tandem master cylinder 10, high pressure fluid will force the lip seals 13, 14 past the dual compensation ports 15, 16, which in turn can cause damage to the lip seals.

One solution to this problem is to provide an additional accumulator downstream of the pump in order to prevent damage to the lip seals. Unfortunately, this additional hardware increases the weight of the braking system and also increases the systems cost. Accordingly, there exists a need to provide a braking system that prevents damage to the lip seals of a tandem master cylinder while minimizing the weight and cost of the braking system.

BRIEF SUMMARY OF THE INVENTION

The present invention provides a braking system that prevents damage to the lip seals of a tandem master cylinder while reducing the weight and cost of the system. The braking system utilizes a unique accumulator to store a sufficient amount of fluid to prevent this damage without requiring any additional hardware.

The braking system provides a braking force through a wheel brake in response to movement of a brake pedal. The braking system generally includes a reservoir containing brake fluid, and a master cylinder including a piston having a lip seal for closing off the compensation port linking the reservoir to the master cylinder. The braking system further includes a brake line and am ABS control unit containing valves and a pump connected with the brake line for pumping fluid from the wheel brake to the master cylinder. The accumulator is positioned between the wheel brake and the pump, and includes a cylinder defining a bore and a piston fitted within the bore. The cylinder defines an inlet and an outlet fluidically connecting the bore to the brake line. The outlet is axially spaced from the inlet and is positioned to be sealed closed by the piston when it is proximate to inlet. The accumulator stores a reserved volume of fluid that is not delivered to the pump via the outlet to thereby reduce the volume of fluid delivered to the master cylinder by the pump and prevent damage to the lip seal. The reserved volume is preferably sized to sufficiently reduce the volume of fluid delivered to the master cylinder to prevent the lip seal from translating past the compensation port, during ABS control.

The accumulator preferably includes a first gasket attached to the piston for translation therewith, the gasket sealing engaging the bore. The piston is axially translatable within the bore between at least two positions including a closed position wherein the gasket is positioned axially between the inlet and outlet to fluidically disconnect the pump and the wheel brake, and an open position wherein the first gasket is axially positioned beyond the inlet and outlet to fluidically connect the pump and wheel brake. In one embodiment, the inlet is located in an end wall of the cylinder and the outlet is located along the sidewall of the cylinder and axially spaced from the end wall. In another embodiment, the end wall is stepped to define an inner portion and an outer portion of the end wall, the outer portion being axially spaced from the inner portion. Here, either the inlet or the outlet is located at the inner portion of the end wall, and the other of the inlet and/or outlet is located at the outer portion of the end wall.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
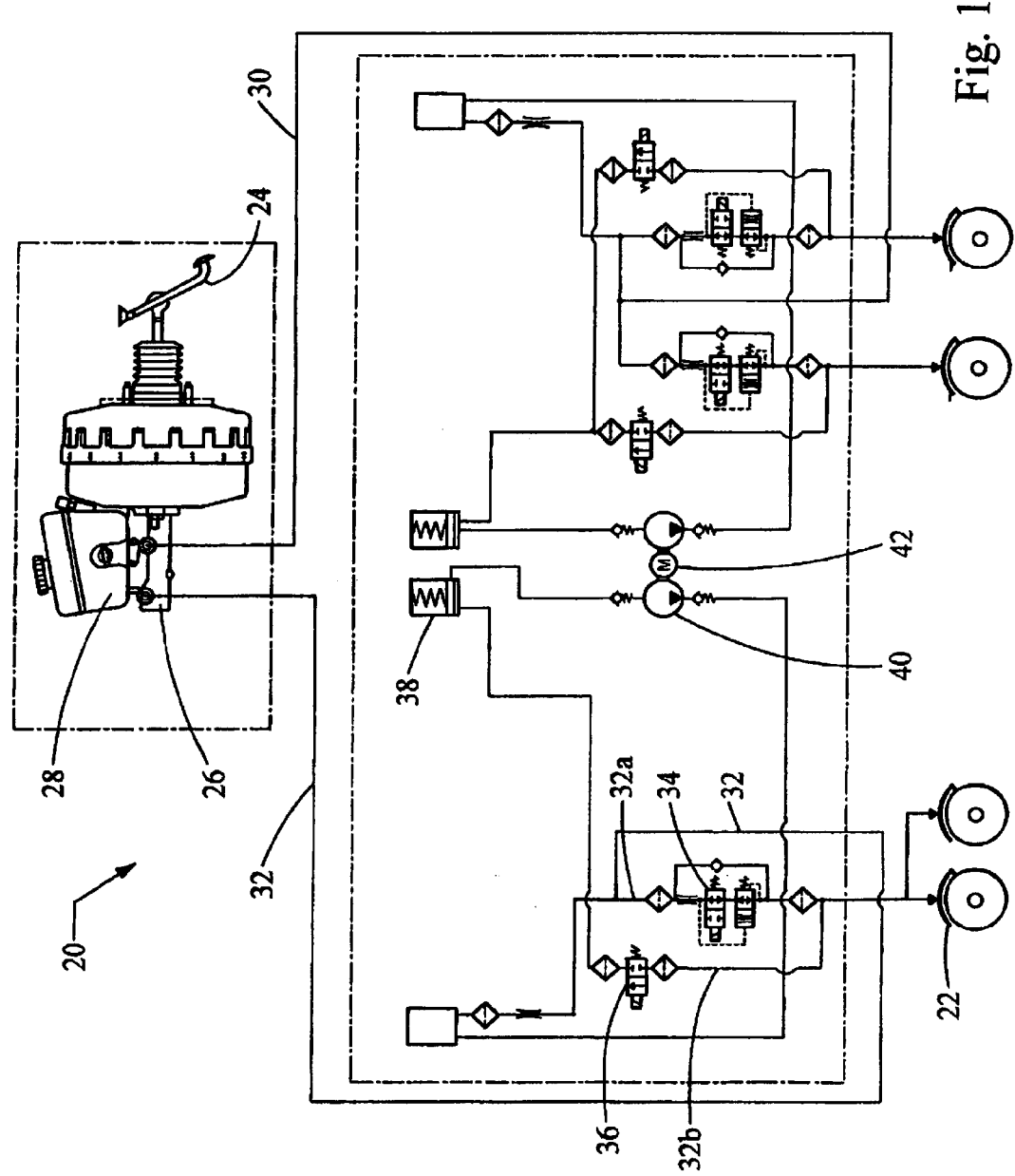
FIG. 1 is a schematic of a braking system having an accumulator constructed in accordance with the teachings of the present invention.

Turning now to the figures, FIG. 1 depicts a braking system 20 constructed in accordance with the teachings of the present invention. The braking system provides a braking force to a wheel brake 22 in response to movement of a brake pedal 24. The brake pedal 24 is operatively connected to a master cylinder 26 which is fluidically connected to a reservoir 28 containing brake fluid. The master cylinder 26 pressurizes fluid in two brake lines, namely a primary brake line 30 and a secondary brake line 32. The secondary brake line 32 is connected to the master cylinder 26 at its downstream end, i.e., the end furthest away from the brake pedal 24. The present invention will be described as applied to the secondary brake line 32.

The flow of fluid from the master cylinder 26 to the wheel brake 22 through the brake line 32 is regulated by an electromagnetic valve 34. The valve 34 is shown in its normally open position, and when the valve 34 is energized it moves to a closed position. The electromagnetic valve 34 is positioned within a brake conduit 32a which forms a portion of the brake line 32. During ABS control, the return flow of brake fluid from the wheel brake 22 occurs through a return conduit 32b. A second electromagnetic valve 36 is positioned within the return conduit 32b to regulate flow from the wheel brake 22. The valve 36 is shown in its normally closed position, and moves to an open position when the valve 36 is energized.

A low pressure accumulator 38 is positioned within the return conduit 32b at a position downstream of the valve 36. A pump 40 driven by motor 42 is utilized to remove fluid from the low pressure accumulator 38. The pump 40 provides pressurized fluid back to the master cylinder 26 via the brake line 32. The design of the low pressure accumulator 38 is the subject invention.

Figure 2:
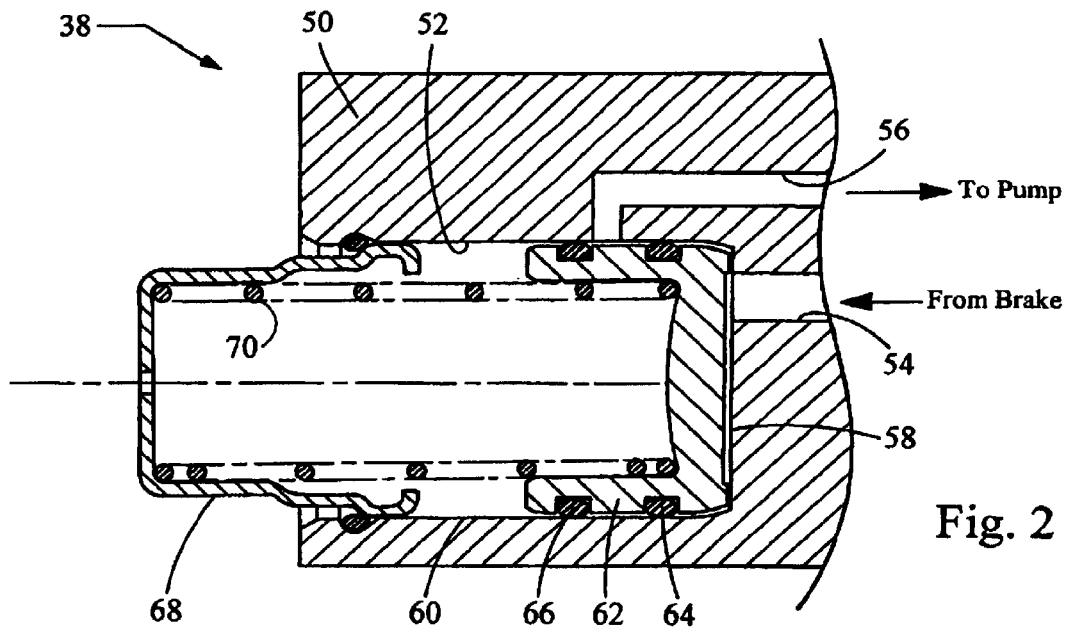
FIG. 2 is a cross-sectional view of one embodiment of the accumulator shown in FIG. 1, the accumulator being in a closed position.
Figure 3:
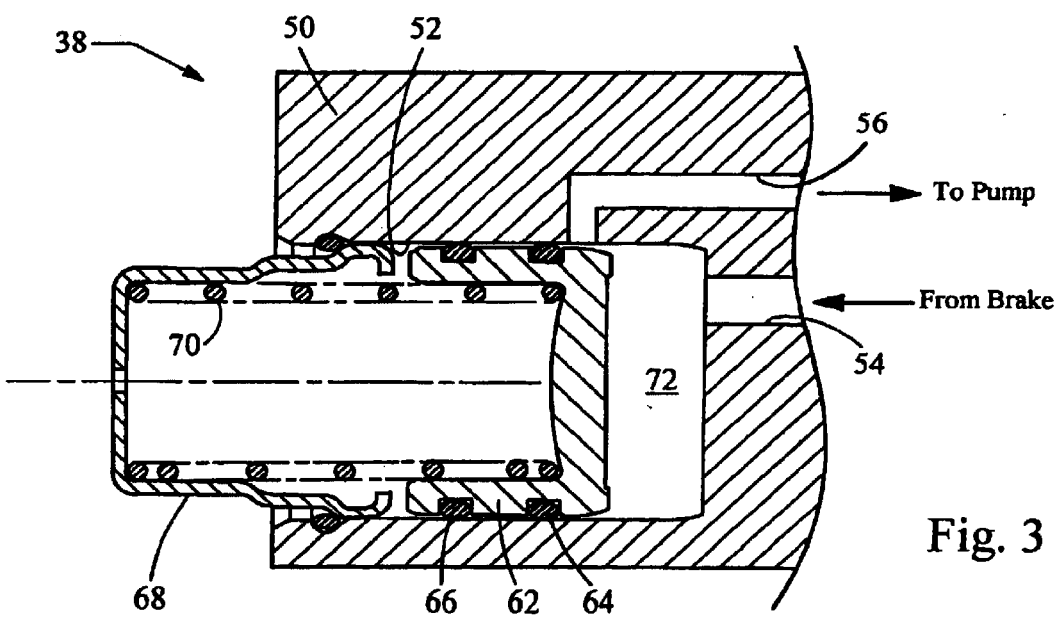
FIG. 3 is a cross-sectional view similar to FIG. 2, but showing the accumulator in an open position.

Turning now to FIGS. 2 and 3, detailed cross-sectional views of the low pressure accumulator 38 have been depicted. The accumulator 38 generally comprises a cylinder 50 defining a bore 52. The bore 52 includes an end wall 58 and an annular side wall 60. The bore 52 is fluidically connected to the brake line 32 and its return conduit 32b via an inlet 54 and an outlet 56. The inlet 54 is located in the end wall 58, while the outlet 56 is located in the side wall 60. Accordingly, the outlet 56 is axially spaced from the inlet 54 and end wall 58.

A piston 62 is fitted within the bore 52 for translation therein. The piston 62 includes a first gasket 64 and a second gasket 66 which are spaced about the outer periphery of the piston 62 for sealingly engaging the cylinder bore 52. A plug 68 is also fitted within the bore 52 and retains a spring 70. The spring 70 is positioned within the bore 52 and extends between the plug 68 and the piston 62 to bias the piston 62 to a closed position adjacent the end wall 58.

In this closed position, the piston 62 fluidically disconnects the inlet 54 from the outlet 56 by way of its first seal 64. That is, the first gasket 64 is positioned between the inlet 54 and outlet 56 in the closed position. However, when fluid pressure in the inlet 54, and hence the return conduit 32b, is sufficient to overcome the spring 70, the piston 62 will move rearwardly within the bore 52. After the bore 52 receives a volume of brake fluid, the piston 62 will move to an open position fluidically connecting the inlet 54 and the outlet 56, as shown in FIG. 3. This open position occurs when the first gasket 64 has translated axially behind the opening of the outlet 56. In this open position, brake fluid is allowed to pass from the inlet 54 through the bore 52 to the outlet 56 which is fluidically connected to the pump 40. Accordingly, the low pressure accumulator 38 defines a reserved volume of fluid which has been denoted by reference numeral 72. The reserved volume of fluid 72 will be stored in the accumulator 38, and will not be delivered to the master cylinder 26 by the pump 40.

Stated another way, the outlet 56 has been axially spaced from the inlet 54 in order to define the reserved volume of fluid 72. Thus, the accumulator 38 will always store the reserved volume of fluid 72 before the inlet 54 is connected to the outlet, and hence before any fluid is delivered to the master cylinder 26 by the pump 40. In this way, a sufficient amount of fluid may be stored in the accumulator 38 to prevent damage to the lip seals in the master cylinder 26. Depending on the distance the lip seals must travel within the master cylinder and the size of the master cylinder 26, the reserved volume of fluid 72 is sized to store an adequate amount of fluid to prevent the damage to the seals. More specifically, the outlet 56 is axially spaced from the inlet 54 and the first gasket 64 a sufficient distance to store an adequate amount of fluid to prevent lip seal damage during ABS control. After ABS control has stopped, the reserved volume of fluid 72 is returned to the master cylinder 26 by opening the electromagnetic valve 36 and allowing the spring 70 to push fluid through conduits 32b and 32.

Figure 4:
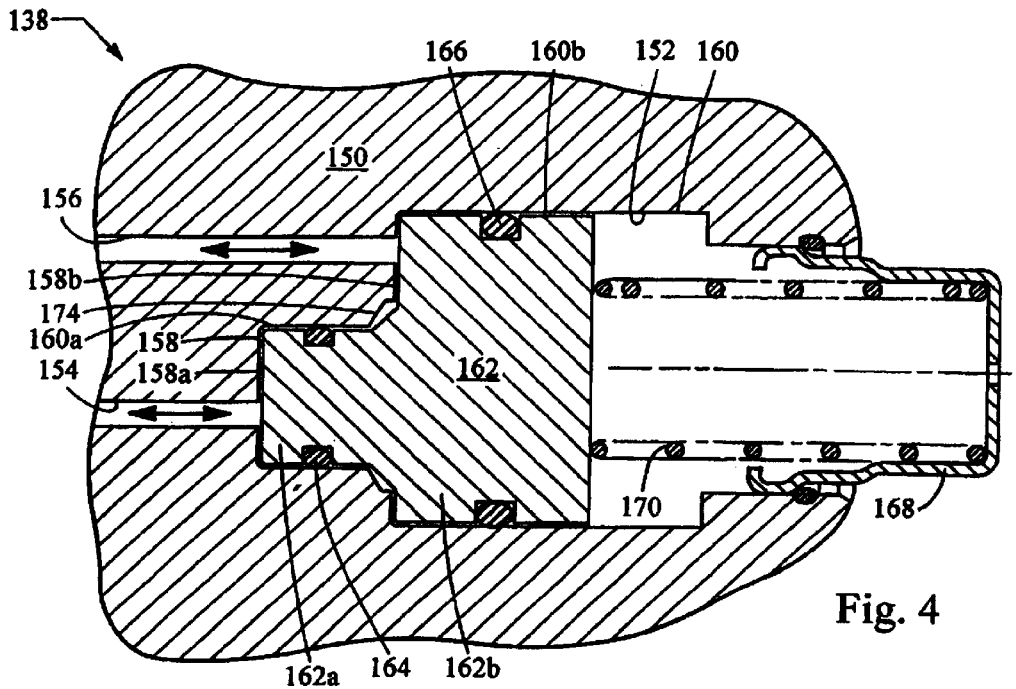
FIG. 4 is a cross-sectional view of another embodiment of an accumulator constructed in accordance with the teachings of the present invention, the accumulator being in a closed position.
Figure 5:
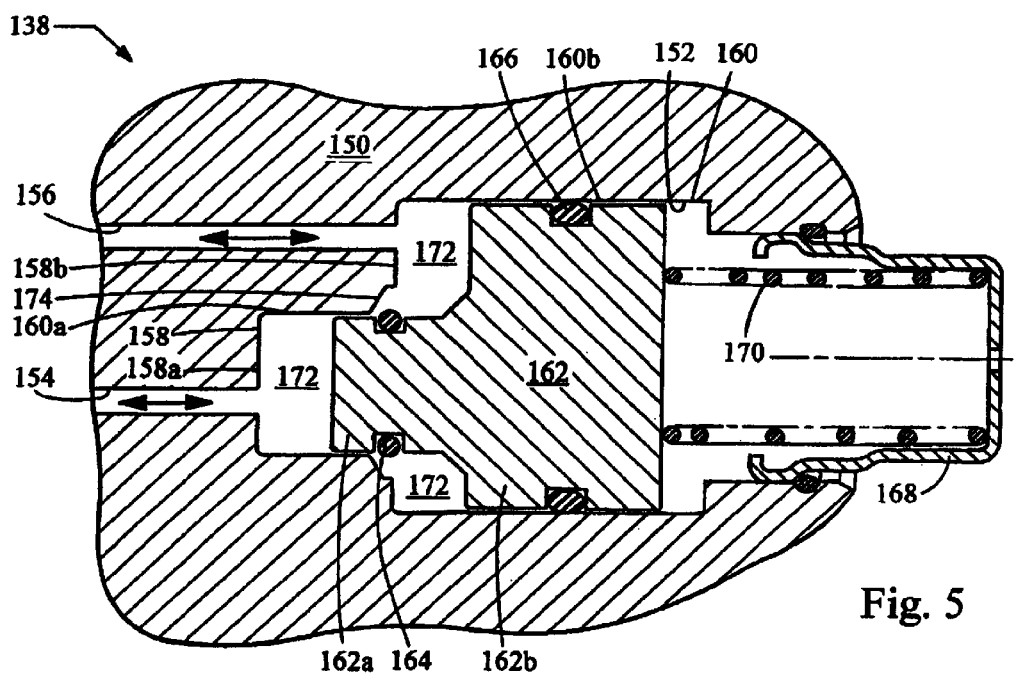
FIG. 5 is a cross-sectional view similar to FIG. 4, but showing the accumulator in an open position.
Figure 6:
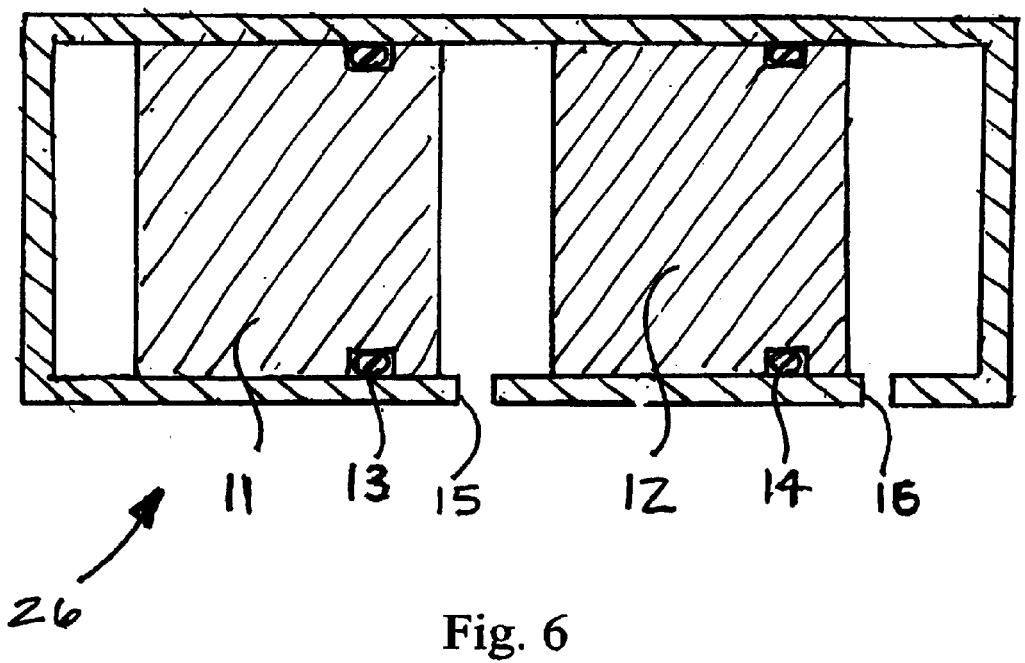
FIG. 6 is a cross-sectional view of the master cylinder depicted in FIG. 1.

Turning now to FIGS. 4 and 5, an alternate embodiment of the low pressure accumulator, denoted by reference numeral 138, has been depicted. As in the prior embodiment, the accumulator 138 includes a cylinder 150 defining a cylinder bore 152. An inlet 154 and outlet 156 are fluidically connected to the cylinder bore 152. Again, the cylinder bore 152 is defined by an end wall 158 and an annular side wall 160. A piston 162 is fitted within the bore 152 for axial translation therein. The outer surface of the piston 162 includes a first gasket 164 and a second gasket 166 that sealingly engage the sidewall 160 of the bore 152. The first gasket 164 fluidically separates the inlet 154 from the outlet 156. That is, the first gasket 164 is positioned between the inlet 154 and outlet 156. A plug 168 is fitted in the cylinder 150 and its bore 152 to retain a spring 170. The spring 170 is fitted between the plug 168 and piston 162 to bias the piston 162 to a closed position proximate the end wall 158.

In this embodiment, the end wall 158 is stepped such that it includes an inner portion 158a and an outer peripheral portion 158b. Similarly, the annular sidewall 160 includes an outer portion 160b and an inner portion 160a. An angled shoulder 172 defines the transition between the inner sidewall portion 160a and the outer end wall portion 158b. Similarly, the configuration of the piston is stepped to define a larger portion 162b and a smaller portion 162a that corresponds with the stepped end wall 158. The first gasket 164 is positioned on the outer surface of the smaller piston portion 162a, while the second gasket 166 is positioned on the outer surface of the larger piston portion 162b.

As in the prior embodiment, when a sufficient pressure occurs in the return conduit 32b and the inlet 154, the piston 162 will be forced back against the action of the spring 170, away from its closed position proximate the end wall 158 (FIG. 4) to an open position as shown in FIG. 5. When the first gasket 164 passes the shoulder 174, the inlet 154 will be fluidically connected to the outlet 156. Thus, the structure of the low pressure accumulator 138 defines a reserved volume of fluid 172 that is stored in the accumulator 138 prior to any delivery of fluid to the master cylinder 26 by the pump 40.

In this manner, a sufficient amount of fluid is stored within the accumulator 138 to prevent damage to the lip seals in the master cylinder 26. It will also be recognized that in this embodiment the inlet 154 and outlet 156 may be switched. That is, fluid from the wheel brake 22 may enter via the conduit 156, which will also force the piston 162 backwards to the open position. Again, when the gasket 164 passes the shoulder 174, the conduit 156 will be connected with the conduit 154, while a reserved volume of fluid is stored. It will also be noted that the outlet 156 is again axially spaced away from the inlet 154. In this embodiment, this occurs because the end wall 158 is stepped such that the outer portion 158b of the end wall 158 is axially spaced from the inner portion 158a of the end wall 158. After ABS control the reserved fluid is returned to the master cylinder as previously described with regard to the prior embodiment.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed:

1. A braking system for providing a braking force through a wheel brake in response to movement of a brake pedal, the braking system including an anti-lock braking system (ABS) for controlling the braking force during an ABS event, the braking system comprising:
   a reservoir containing brake fluid;
   a master cylinder including a piston having a lip seal for closing off a compensation port linking the reservoir to the master cylinder;
   a brake line including a brake conduit and a return conduit in fluid communication with the wheel brake;
   a pump connected to the return conduit for pumping fluid from the wheel brake to the master cylinder during an ABS event;
   an accumulator positioned between the wheel brake and the pump, the accumulator having cylinder defining a bore and a piston fitted within the bore, the cylinder defining an inlet and an outlet fluidically connecting the bore to the return conduit, the cylinder having an end wall and a side wall defining the bore, the end wall being stepped to define an inner portion and an outer portion of the end wall, the outer portion being axially spaced from the inner portion, the inlet being located at the inner portion of the end wall and the outlet being located at the outer portion of the end wall, the pump connected to the accumulator only by way of the outlet of the accumulator; and
   the outlet being axially spaced from the inlet and positioned to be sealed closed by the piston when the piston is proximate the inlet, the piston being translatable axially to open the outlet and fluidically connect the pump to the wheel brake, the accumulator storing a reserved volume of brake fluid that is not delivered to the pump via the outlet to thereby reduce the volume of fluid delivered to the master cylinder by the pump and prevent damage to the lip seal.

2. The braking system of claim 1, wherein the reserved volume is sized to sufficiently reduce the volume of fluid delivered to the master cylinder by the pump to prevent the lip seal from translating past the compensation port.

3. The braking system of claim 1, further comprising a first gasket attached to the piston for translation therewith, the first gasket sealing engaging the bore, and wherein the piston is axially translatable within the bore between at least two positions including:
   a closed position wherein the first gasket is positioned axially between the inlet and the outlet to fluidically disconnect the pump and wheel brake, and
   an open position wherein the first gasket is axially positioned beyond the inlet and outlet to fluidically connect the pump and wheel brake.

4. The braking system of claim 1, wherein the outlet is located along the side wall.

5. The braking system of claim 4, wherein the outlet is axially spaced from the end wall.

6. The braking system of claim 1, wherein the inlet is located at the outer portion of the end wall and the outlet is located at the inner portion of the end wall.

7. The braking system of claim 1, wherein the inlet and outlet are separate conduits linked to the brake line.

8. The braking system of claim 1, wherein the master cylinder is a tandem master cylinder having the piston and a secondary piston for controlling the pressure of brake fluid in the brake line and a secondary brake line, the pistons each having a lip seal for closing off the compensation port and a second compensation port linking the reservoir to the master cylinder.

9. The braking system of claim 1, wherein the accumulator does not include an outlet axially aligned with the inlet.

10. The braking system of claim 1, wherein the pump is connected to the return conduit in a manner only to remove fluid from the wheel brake during an ABS event.

11. The braking system of claim 1, wherein the braking system does not include a controllable valve between the accumulator and pump.

12. An accumulator for a braking system providing a braking force through a wheel brake in response to movement of a brake pedal, the braking system including a master cylinder responsive to the brake pedal for increasing fluid pressure in a brake line connected to the wheel brake, the braking system further including a pump connected to the brake line for pumping fluid from the wheel brake to the master cylinder, the accumulator comprising:
   a cylinder having an end wall and a side wall defining a bore having a central axis, the bore being stepped to define a reduced diameter portion and an inner portion and an outer portion of the end wall, the outer portion of the end wall being axially spaced from the inner portion of the end wall;
   an inlet formed in the end wall and fluidically connecting the bore to the brake line;
   an outlet formed in the end wall and fluidically connecting the bore to the brake line, the outlet being axially spaced from the inlet;
   the inlet, bore, and outlet fluidically connecting the wheel brake to the pump; and
   a piston positioned within the bore and axially translatable therein;
   a first gasket attached to the piston for translation therewith, the first gasket positioned to sealingly engage the reduced diameter portion of the bore; and
   the piston being axially translatable within the bore between at least two positions including:
      a closed position wherein the first gasket is engaged with the reduced diameter portion of the bore to fluidically disconnect the pump and wheel brake, and
      an open position wherein the first gasket is disengaged from the reduced diameter portion of the bore to fluidically connect the pump and wheel brake.

13. The accumulator of claim 12, wherein the translation of the piston between the closed and open positions defines a reserved volume of brake fluid that is not delivered to the pump via the outlet.

14. The accumulator of claim 13, wherein the reserved volume of fluid is sized to sufficiently reduce the volume of fluid delivered to the master cylinder by the pump to prevent damage to a lip seal within the master cylinder.

15. The accumulator of claim 12, further comprising a spring biasing the piston to a third neutral position proximate the inlet.

16. The accumulator of claim 12, wherein the inlet and outlet are separate conduits linked to the brake line.

17. The accumulator of claim 12, further comprising a second gasket attached to the piston for translation therewith, the second gasket sealing engaging the bore and being axially spaced behind the inlet and outlet.

18. The accumulator of claim 12, wherein the inlet is located at the inner portion of the end wall and the outlet is located at the outer portion of the end wall.

19. The accumulator of claim 12, wherein the inlet is located at the outer portion of the end wall and the outlet is located at the inner portion of the end wall.

20. The accumulator of claim 12, wherein the stepped bore defines an inner portion and an outer portion of the side wall, the first gasket sealingly engaging the inner portion of the side wall in the closed position.

* * * * *